United States Patent Office 3,231,365
Patented Jan. 25, 1966

3,231,365
PLANT GROWTH WITH FERTILIZER INCLUDING NONIONIC WETTING AGENT
Nils Gösta Wahlberg, Ornskoldsvik, Sweden, assignor to Mo och Domsjo Aktiebolag, Ornskoldsvik, Sweden, a limited company of Sweden
No Drawing. Filed Feb. 12, 1963, Ser. No. 257,888
5 Claims. (Cl. 71—64)

This invention relates to a fertilizer composition which improves plant growth, and to a process of growing plants using the same, and more particularly to a fertilizer composition comprising a fertilizer and a nonionic wetting agent, and to a process of using the same.

When fertilizing earth or soil with, for example, artificial fertilizers of different kinds it is of great importance that the fertilizers should be spread out in such a way that they will be evenly distributed in the soil, so that the roots of the plants get a chance during the whole period of growth to grow in layers of soil, where the nutrient salts of the fertilizers are available.

The most common way of spreading the fertilizers is to spread the same by means of a fertilizer distributor as evenly as possible on the surface of the soil. In some cases this is followed by ploughing or harrowing the fertilizers into the soil. It is often advantageous to let the fertilizers stay on the ground, a process called top-dressing.

Another way of spreading fertilizers consists in spraying the ground with a solution of the fertilizer. In certain cases it is an advantage to add fertilizer to the seed, so that the young germs will quickly come into contact with the nutrients. It is also common practice to supply with fertilizer the root systems of plants which are to be planted out in order to give them a good start. There are also other ways of spreading fertilizers.

It has now been found, in accordance with the invention, that the action of fertilizers can be considerably enhanced in the presence of an organic nonionic wetting agent. An increased rate of growth of the plants is observed, which rate of growth is greater than that obtainable either with the fertilizer or with the nonionic wetting agent alone, so that the effect of the nonionic wetting agent can be said to be synergistic. The effect is the more surprising because the wetting agent itself does not have any fertilizing action. It is thought that the wetting agent may enhance in some way the distribution of the fertilizer components in the soil, so as to make the fertilizers more quickly available to the root system of the plant. After rainfall or watering, or both, as a result of which the nutrient salts in the fertilizer are dissolved to form an aqueous salt solution, the nonionic wetting agent is also dissolved with the fertilizer, and increases the ability of the salt solution to sink quickly and spread in the earth, due to the lowering of the surface tension of the solution. The earth may be more readily wetted by the solution so that the salt solution is effectively spread more homogeneously throughout the area. Thus, the root hairs of the plants are better able to grow in earth or ground areas having a continuous supply of such salt solution than when the root hairs grow in earth or ground areas in which the salt solutions do not contain a wetting agent. Better growth conditions are created for the plants taking up of nourishment, and thus the plants grow better and more quickly than when fertilizer alone is added. The above explanation is offered, so that the invention may be the better understood, but it is emphasized that this has not been demonstrated conclusively by experiment, and may, in fact, be incorrect. The actual mechanism by which the nonionic wetting agent increases the effectiveness of the fertilizer is, in fact, unknown.

Accordingly, the fertilizer compositions of the present invention comprise a fertilizer of conventional type and an organic nonionic wetting agent.

British Patent No. 828,891 suggests adding a nonionic wetting agent to fertilizers to facilitate the manufacturing process and improve the physical properties of the product, but the quantity of wetting agent added for this purpose is very small, less than 0.1% of the fertilizer component, and this amount is, in fact, too small to increase the effectiveness of the fertilizer after application to the soil. In accordance with the invention it has been determined that the amount of nonionic wetting agent required for the enhanced growth observed in the compositions of the invention is at least 0.5%, calculated on the dry weight of the fertilizer component, and can range to 10% or more by weight of the fertilizer. In fact, the upper limit of 10% mentioned is merely suggested, since larger amounts can be used, if desired, but larger amounts are usually not required, and will not, in most cases, give an enhanced result.

In addition to the active fertilizer component or components, and the nonionic wetting agent, the composition can include the conventional adjuncts for such compositions, including inactive substances or extenders such as peat and kieselguhr. Such adjuncts are particularly desirable when the fertilizer is to be applied in dry form. The fertilizer can also be applied in aqueous solutions, in which event the fertilizer components will be water-soluble or water-dispersible. Emulsifiers can be added to increase the ease of dispersion of the components, when these are water insoluble, but usually the organic nonionic wetting agent employed has emulsifying properties, so that no additional emulsifier will be necessary.

The fertilizer compositions of the invention can be applied as a surface coating to soil either in the dry form, by dusting or spreading, or in aqueous solution by spraying or flowing on. It can also be applied as a surface coating to seeds which are ready to be sown, or to the roots of plants which are to be planted out.

In many cases, the ground or earth is supplied with peat or other substances for the purposes of forming earth mold. The decay of these substances is accelerated and improved if they contain nutrient substances necessary for the decaying process, in combination with nonionic wetting agents, which aid in maintaining a suitable moisture content during the decay.

The fertilizer employed in accordance with the invention can be any of the conventional fertilizers or combinations of fertilizing components which are employed in this art. The fertilizer is formulated to provide the nutrient balance required by the plants which are to be grown and the soil to which it is to be applied. The proper nutrients for various types of plants and crops are well known, and form no part of the instant invention. The fertilizer components will include sources of nitrogen, phosphorus, sulfur, and various metals such as cobalt, iron, and the like, where required.

Fertilizers in commercial use are formulated to the desired nutrient balance with one or a mixture of several inorganic salts, the exact proportions used depending upon the requirements of the plants and the soil. Representative inorganic salts useful in fertilizers, whether in the solid state or dissolved in a suitable solvent such as water, include ammonium sulfate, ammonium chloride, ammonium nitrate, ammonium dihydrogen phosphate, ammonium acid phosphate, ammonium carbonate, ammonia, potassium sulfate, potassium chloride, potassium nitrate, potassium dihydrogen phosphate, potassium acid phosphate, potassium phosphate, potassium phosphite, potassium carbonate, calcium hydroxide, calcium sulfate, calcium chloride, calcium nitrate, calcium metaphosphate, calcium acid phosphate, calcium phosphate, calcium carbonate, calcium cyanamide, magnesium hydroxide, magnesium sulfate, magnesium chloride, magnesium nitrate, magnesium carbonate, sodium sulfate, sodium chloride, sodium nitrate, sodium diacid phosphate, sodium acid phosphate, sodium phosphate, sodium carbonate and sodium borate. These can be used in the form of the hydrates.

In many instances, the foregoing salts are employed individually as fertilizers, but for many purposes, the fertilizer should contain a mixture of several components. Representative mixed fertilizers include Leuna saltpeter (a blend of ammonium sulfate and ammonium nitrate), mixed ammonium dihydrogen phosphate and ammonium sulfate, mixed diammonium acid phosphate and ammonium sulfate (Leunaphos), basic Bessemer slag (containing about 18% $P_2O_5$, 47% CaO, 4% MgO, 0.5% $SO_3$), basic open hearth slag (containing about 12% $P_2O_5$, 45% CaO, 5% MgO, 0.5% $SO_3$), calcium nitrate-urea (containing approximately 13% CaO), calcium ammonium nitrate (15% CaO, 2% MgO, 20% N), carnallite (10% $K_2O$, 10% MgO), kainite (18% $K_2O$, 5% MgO, 10% $SO_3$), Nitrophoska (12% N, 12% $P_2O_5$, 22% $K_2O$, 9% CaO, 1.5% MgO and 3% $SO_3$), phosphate rock, natural potash, nitrate of soda potash (mixed potassium and sodium nitrates containing about 15% $K_2O$), kali-magnesia (mixed potassium and magnesium sulfate containing 25% $K_2O$, 12% MgO, 2% CaO, 45% $SO_3$), Potazote (mixed potassium and ammonium chlorides containing 13% N, 22% $K_2O$), mixed potassium and ammonium phosphates (containing 5.5% N, 54% $P_2O_5$, 18% $K_2O$), 20% superphosphate (20% $P_2O_5$, 25% CaO, 0.5 MgO, 30% $SO_3$), 40% superphosphate (40% $P_2O_5$, 20% CaO, 0.5% MgO, 2.5% $SO_3$), ammoniated 20% superphosphate (4% N, 15% $P_2O_5$, 25% CaO, 0.5% MgO and 30% $SO_3$), ammoniated 40% superphosphate (6% N, 45% $P_2O_5$, 18% CaO, 0.5% MgO and 2.5% $SO_3$), superphosphate-urea (7% N, 15% $P_2O_5$, 15% CaO, 0.3% MgO, 25% $SO_3$), Chile saltpeter, bone ashes (35% $P_2O_5$, 46% CaO, 1% MgO, 0.5% $SO_3$), cotton seed hull ashes (5.5% $P_2O_5$, 27% $K_2O$, 9.5% CaO, 5% MgO, 2.5% $SO_3$), sun flower ashes (2.5% $P_2O_5$, 36% $K_2O$ and 18% CaO), tobacco ashes (3% $P_2O_5$, 23% $K_2O$, 22% CaO, 6% MgO, 55% $SO_3$), and wood ashes (2% $P_2O_5$, 5% $K_2O$, 32% CaO, 3.5% MgO, 1% $SO_3$).

In addition to the foregoing, urea is used alone or in conjunction with other materials as fertilizers. Also used are animal meals, air dried seaweed and vegetable residues such as castor bean pomace, cocoa shells, cottonseed meal, linseed meal, rapeseed meal, soybean meal, tobacco stems, and wool wastes. Further details on the amounts of fertilizer and various types employed for particular applications can be found by reference to the following books, the disclosures of which is incorporated by reference:

The Soil and Its Fertility, by Teuscher and Adler (Reinhold, 1960, New York).

Commercial Fertilizers, by Collings (5th Edition, McGraw-Hill, New York, 1955).

Using Commercial Fertilizers, by McVickar (2nd Edition, Interstate, Danville, Illinois, 1961).

The fertilizer will comprise from about 25% to about 99.5% by weight of the composition. In fact, when the only components are wetting agent and fertilizer, the fertilizer usually will comprise from 90% to 99.5% by weight of the composition. When the fertilizer composition contains inactive components, such as peat and kieselguhr, the amount of fertilizer will be considerably less and may be as little as 25% by weight of the composition with the adjuncts in an amount within the range from 0 to 75% by weight of the composition, the remainder being nonionic wetting agent, in an amount within the range from 0.5 to about 10%.

Any of the organic nonionic wetting agents, which are well known in the wetting agent or emulsifying art, can be employed in the invention. Preferably the wetting agent is water-soluble, but water-dispersible wetting agents can also be used. By "water-soluble" it is meant that the agent is soluble in water in the concentrations required for an aqueous fertilizing solution.

Exemplary organic nonionic wetting agents include alkyl and aralkyl amino and amido and alkyl oxyether and ester and thioether and ester wetting agents having the following general formula:

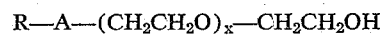

$$R—A—(CH_2CH_2O)_x—CH_2CH_2OH$$

where R is a straight or branched chain saturated or unsaturated hydrocarbon group having from 8 to 18 carbon atoms, or an aralkyl group having a straight or branched chain saturated or unsaturated hydrocarbon group of from 8 to 18 carbon atoms attached to the aryl nucleus, and attached to A through the aryl nucleus, A is selected from the group consisting of ethereal oxygen and sulfur, amino, amido, carboxylic ester and thiocarboxylic ester groups and $x$ is a number from 8 to 20. R can, for example, be a straight or branched chain alkyl group, such as octyl, nonyl, decyl, lauryl, myristyl, cetyl, or stearyl, or an alkylaryl group such as actylphenyl, nonylphenyl, decylphenyl, stearylphenyl, etc.

Where R is alkyl, it will be evident that the wetting agent can be regarded as derived from an alcohol, mercaptan, amine, oxy or thio fatty acid of high molecular weight, by condensation with ethylene oxide. Typical of this type of alkyl product are the condensation products of oleyl or lauryl (dodecyl) alcohol, mercaptan, or amine, or oleic or lauric acid, with from 8 to 17 moles of ethylene oxide, such as "Emulfor ON." Typical alkyl esters are "Renex" (polyoxyethylene ester of tall oil acids) and "Neutronyl 331" (higher fatty acid ester of polyethylene glycol).

Where R is aralkyl, the wetting agents can be derived from an alkyl phenol or thiophenol.

The ethoxylated alkyl phenols and thiophenols have the following general formula:

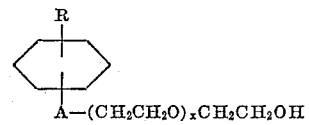

where R is a straight or branched chain saturated or unsaturated hydrocarbon group having at least 8 carbon atoms up to approximately 18 carbon atoms, A is oxygen or sulfur, $x$ is a number from 8 to 20. R can, for example, be a straight or branched chain octyl, nonyl, decyl, lauryl, cetyl, myristyl or stearyl group. Typical are the condensation products of octyl and nonyl phenol and thiophenol with from 8 to 17 moles of ethylene oxide, available commercially under the trade name "Igepal CA."

Also useful are the polyoxyalkylene compounds described in U.S. Patents Nos. 2,674,619 and 2,677,700, which are of the type:

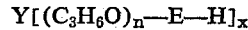

$$Y[(C_3H_6O)_n—E—H]_x$$

where

Y is the residue of an organic compound containing therein $x$ active hydrogen atoms, $n$ is an integer, $x$ is an integer greater than 1, The values of $n$ and $x$ are such that the molecular weight of the compound, exclusive of E, is at least 900, as determined by hydroxyl number, E is a polyoxyalkylene chain wherein the oxygen/carbon atom ratio is at least 0.5, and E constitutes 20–90%, by weight, of the compound or of the type:

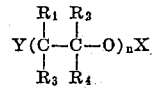

wherein

Y is the residue of an organic compound containing therein a single hydrogen atom capable of reacting with a 1,2 alkylene oxide, $R_1$, $R_2$, $R_3$ and $R_4$ are selected from the group consisting of H, aliphatic radicals and aromatic radicals, at least one such substituent being a radical other than hydrogen, n is greater than 6.4 as determined by hydroxyl number, and X is a water-solubilizing group.

Those skilled in the art will recognize other types of nonionic wetting agents that can be used. Additional types will be found in Schwartz and Perry, "Surface Active Agents," Second Edition, Interscience Publishers, the disclosure of which is incorporated by reference.

The following examples in the opinion of the inventor represent preferred embodiments of the invention.

*Example 1.—Experiments with peas*

Experiments were performed to determine the increase in growth for twelve plots, divided in four groups of three each, of peas which had been grown in earth using the various treatments described below, with an addition of fertilizer treated with a nonionic wetting agent.

The three plots forming plot (1) were treated with an addition of fertilizer treated with nonionic wetting agent.

The three plots forming plot (2) were treated only with a fertilizer of the same kind and in the same quantity as in plot (1).

The three plots forming plot (3) were treated only with a wetting agent of the same kind and in the same quantity as in plot (1).

The three plots forming plot (4) were grown without any addition of a wetting agent or fertilizer in any form.

In all cases, the pea plants were grown in rectangular plastic boxes, each filled with the same amount of sandy soil. The sandy soil was stirred in a soilmixer before the experiments were begun, so that the structure, the moisture and the nutrient conditions were the same in all the plastic boxes at the beginning of the test. In order to obtain controlled conditions, the plots were grown in climate chambers with identical conditions for all twelve plots. The pea plants in all the plots thus grew up in the same conditions of light, humidity, air temperature, air movement, and atmosphere, and received per plastic box the same amount of water of the same sort and of the same temperature, and the watering was carried out at the same intervals. The sowing of the seeds in all the plastic boxes took place at the same time and the peas were dibbled to the same depth.

Number of sown peas in each plastic box: 10. Soil area per box: 2.1 dm.²

The following are the details of the treatments for the three boxes of each plot:

Plot (1). Addition of fertilizer: 0.5 g. "NPK-fertilizer"[1]+0.0315 g. wetting agent "Berol VMA–09"[2] per plastic box (corresponding to 23.8 g. "NPK-fertilizer"+1.5 g. "Berol VMA–09" per m.² soil area).

In order to obtain an even distribution of the wetted fertilizer over the soil surface, the fertilizer was dissolved in the water used for watering the soil surface on the first watering occasion. No further wetting agent or fertilizer was added during the test period.

Plot (2). Addition of fertilizer: 0.5 g. "NPK-fertilizer" per plastic box (corresponding to 23.8 g. "NPK-fertilizer" per m.² soil surface).

In order to obtain an even distribution of the fertilizer over the soil surface it was dissolved in the water used for the first watering of the soil surface. No further fertilizer was added during the test period.

Plot (3). Addition of wetting agent: 0.0315 g. "Berol VMA–09" per plastic box (corresponding to 1.5 g. "Berol VMA–09" per m.² soil area).

In order to obtain an even distribution of the wetting agent, it was added to the water used for the first watering of the soil surface. No further addition of wetting agent was made during the test period.

Plot (4). Control: no addition of a wetting agent or fertilizer was made during the test period. The amounts of water and number of waterings were the same as in the other tests.

In order to obtain a correct result the dry weights of the pea plants were determined at the end of the test period. The individual plants were then cut off at the soil surface. The determination of the dry weight thus concerns the parts of the plants above the ground.

It is impossible to determine the weight of the root because one does not know how much earth there is on the roots. As to the roots it can be said, however, that the same weight tendency holds good for the roots as for the part of the plant above the ground.

TABLE I.—DRY WEIGHT FOR THE PART OF THE PLANT ABOVE THE GROUND

|  | Plot No. | | | |
| --- | --- | --- | --- | --- |
|  | (1) | (2) | (3) | (4) |
| Dry weight in grams, average per plastic box | 1.30 | 0.87 | 0.93 | 0.79 |
| Relation number | 165 | 110 | 118 | 100 |
| Growing time in days | 45 | 45 | 45 | 45 |

Table I shows that plot (1) is far superior to the other plots. The best effect is thus obtained with the combination of nutrient salts and wetting agent. Neither the same quantity of fertilizer alone nor of wetting agent alone as in plot (1) had any significant effect on the growth, even though plot (2) as well as (3) are superior to plot (4). It is only when a combination of fertilizer and wetting agent is used that the growth is synergistically increased, compared with the other tests. This is most likely due to the fact that the root hairs do not need to pass through any dry areas, where there may be nutrient salts but where the root hairs cannot make use of them owing to lack of moisture. By adding wetting agents to the nutrient salts it has been ensured that the conditions necessary for the assimilation by the plant are maintained, viz. the combined presence of nutrient salts and moisture.

*Example 2.—Experiments with barley*

A growth test was started by sowing barley (*Hordeum hexastichum*) on flat farming land at Back village in the parish of Satra where the earth consisted of fine sandy soil. Within the test areas the earth was of the same kind and had received the same basic amount of fertilizer.

The two plots had each an area of 7 x 7 m.=49 m.², and were placed in such a relationship to one another that they had a common base to which the sides of the plots were perpendicular. The plots were separated by a safety zone, which was 1.5 m. wide, in order to avoid edge effects.

Barley (*Hordeum hexastichum*) was sown with an ordinary drill in such a way, that the sowing rows were parallel with the base line. In this way each sowing row passed through both plots. Previous fertilizing runs had also been carried out in the same direction. Immediately after the sowing a top-dressing of the plots was carried out in the following manner:

Plot (3), the control area, was supplied with a total amount of 1.225 kgs. of NPK-fertilizer, a commercially available artificial fertilizer containing nitrogen, phosphorus and potassium, in powder form corresponding to 250 kgs./ha. The fertilizer was distributed equally over the whole area. Immediately after the distribution the surface was sprayed with 12.5 liters of water, by means of a pressure sprayer provided with an atomizing nozzle so that the fertilizer and the soil surface were adequately moistened.

Plot (4), the test area, was supplied with 1.225 kgs. of NPK-fertilizer in powder form from the same fertilizer ---
[1] A commercially available artificial fertilizer containing nitrogen, phosphorus and potassium.
[2] A commercially available, non-ionic wetting agent, a nonyl phenol ethylene oxide condensation product having a molecular weight of about 650.

package as was used on plot (3). The quantity corresponds to 250 kgs./ha. Prior to the distribution the fertilizer was homogenously mixed with 73.5 g., i.e., 6% calculated on the weight of the fertilizer, of the wetting agent VMA-09, which corresponds to 15 kgs./ha. The distribution of fertilizer was the same over the whole area and was performed in the same manner as on plot (3). Immediately after the distribution the surface was sprayed with 12.5 liters of water. The spraying was carried out with the same sprayer, with the same nozzle and in the same manner as on plot (3) so that fertilizer and soil surface were moistened.

No further fertilizer or wetting agent was added during the test period and no further artificial irrigation was carried out.

RESULTS

Forty-five days later it was found by measuring the length of samples of the barley straw that the straws in plot (4) were 15% longer than in plot (1).

Four months later, the barley in both plots was harvested and the straw and barley grains were weighed.

The following results were obtained:

TABLE II

|  | Plot (3) Control Area | Plot (4) Test Area |
|---|---|---|
| Area of plot, m.² | 49 | 49 |
| Total weight of the raw straw with attached barley ears, kg | 62.2 | 76.4 |
| Relation number | 100.0 | 122.8 |

Table II shows that the weight of the straw with ears in plot (4) was 22.8% higher than in plot (3).

Two weeks and two days later the barley was threshed and the threshed grain from the plots was weighed separately. The following results were obtained:

TABLE III

|  | Plot (3) Control Area | Plot (4) Test Area |
|---|---|---|
| Area of plot, m.² | 49 | 49 |
| Total weight of barley in air-dry form, kg | 5.443 | 6.267 |
| Relation number | 100.0 | 115.1 |

Table III shows that the raw weight of threshed barley was 15.1% higher in plot (4) than in plot (3).

Immediately after the threshing of the barley, ten samples were taken at random from each lot of barley (from plot (3) and plot (4)) for determining the dry weights per 1000 grains by drying the samples for 18 hours at a temperature between $+100°$ and $+105°$ C. The results obtained are shown in the following Table IV:

TABLE IV

| | Plot 3 (Control area) | | | Plot 4 (Test area) | | |
|---|---|---|---|---|---|---|
| | Weight of 1,000 grains in g. | | Dry substance in percent | Weight of 1,000 grains in g. | | Dry substance in percent |
| | Air-dry | Dried | | Air-dry | Dried | |
| | 31.53 | 25.12 | 79.67 | 35.84 | 29.15 | 81.33 |
| | 32.62 | 25.96 | 79.58 | 35.66 | 28.75 | 80.62 |
| | 31.66 | 25.07 | 79.19 | 37.70 | 30.49 | 80.88 |
| | 32.01 | 25.24 | 78.85 | 38.15 | 30.85 | 80.87 |
| | 31.49 | 25.14 | 79.83 | 35.92 | 28.53 | 79.43 |
| | 32.38 | 25.86 | 79.86 | 35.75 | 28.83 | 80.64 |
| | 33.43 | 26.59 | 79.54 | 42.49 | 33.67 | 79.24 |
| | 32.34 | 25.77 | 79.68 | 34.83 | 28.21 | 80.99 |
| | 31.76 | 24.95 | 78.56 | 34.92 | 28.45 | 81.47 |
| | 32.54 | 25.73 | 79.07 | 36.81 | 29.76 | 80.85 |
| Average | 32.18 | 25.54 | 79.37 | 36.81 | 29.67 | 80.60 |
| Relation number | 100.0 | 100.0 | | 114.4 | 116.2 | |

Table IV shows that the weight of 1000 grains was considerably higher in plot (4) than in plot (3) for both the air-dry barley and the absolutely dry sample. Plot (4) gave an average weight of 1000 grains, which was 14.4% higher for the air-dry barley and 16.2% higher for the completely dry corn than in plot (3) (the control area).

All the experiments clearly show that the yield has increased considerably in plot (4) (the surface provided with a top-dressing of NPK-fertilizer and an addition of Berol VMA-09) in comparison with plot (3) which was only provided with the same amount of NPK-fertilizer.

It is already known that agricultural land gives a greater harvest if artificial fertilizer, for example of the type NPK, is added as a top-dressing. It was thus interesting to investigate whether this was also the case on the type of land where the test was carried out, and a third plot (5) was grown for this purpose. 100 mutually equivalent full ears were taken from each of the two plots (3) and (4) and from the plot grown on the initially fertilized soil—plot (5)—for dry weight determination. The samples were taken just before the harvest, and were dried indoors. After threshing ten samples were taken at random from each of the three different plots to determine the weight of 1000 grains in air-dry condition and in a completely dry condition. The result of the weight determinations appear from the following table:

TABLE V.—EQUIVALENT INITIAL FERTILIZATION

| | Plot (3) | | | Plot (4) | | | Plot (5) | | |
|---|---|---|---|---|---|---|---|---|---|
| | No top-dressing | | | Top-dressing with NPK-fertilizer, provided with 6% Berol VMA-09, totally 265 kgs./ha. | | | Top-dressing with NPK-fertilizer 250 kgs./ha. (No wetting agent) | | |
| | Air-dry sample 1,000 grains, grams | Dried sample 1,000 grains, grams | Dry substance, percent | Air-dry sample 1,000 grains, grams | Dried sample 1,000 grains, grams | Dry substance, percent | Air-dry sample 1,000 grains, grams | Dried sample 1,000 grains, grams | Dry substance, percent |
| | 29.22 | 26.83 | 91.82 | 35.86 | 32.48 | 90.57 | 35.12 | 30.92 | 88.04 |
| | 29.94 | 27.51 | 91.88 | 38.67 | 35.04 | 90.61 | 33.08 | 29.07 | 87.88 |
| | 30.01 | 27.58 | 91.90 | 37.41 | 33.85 | 90.48 | 34.15 | 29.97 | 87.76 |
| | 32.06 | 29.44 | 91.83 | 35.49 | 32.17 | 90.65 | 34.12 | 30.32 | 88.86 |
| | 30.40 | 27.99 | 92.07 | 38.00 | 34.48 | 90.74 | 34.72 | 30.91 | 89.03 |
| | 30.72 | 28.19 | 91.76 | 37.48 | 33.92 | 90.50 | 33.31 | 29.20 | 87.66 |
| | 32.47 | 29.80 | 91.78 | 37.25 | 33.31 | 89.42 | 34.26 | 30.42 | 88.79 |
| | 29.30 | 26.92 | 91.88 | 36.33 | 32.57 | 89.53 | 36.51 | 32.49 | 88.99 |
| | 29.88 | 27.92 | 93.44 | 38.20 | 34.22 | 89.58 | 35.27 | 31.03 | 87.98 |
| | 32.79 | 30.15 | 91.95 | 36.32 | 32.50 | 89.48 | 35.10 | 30.80 | 87.75 |
| Average | 30.68 | 28.23 | 92.01 | 37.11 | 33.45 | 90.14 | 34.56 | 30.51 | 88.28 |
| Relation number | 100.0 | 100.0 | | 121.0 | 118.5 | | 112.6 | 108.1 | |

The table shows that plot (3), the only initially fertilized plot, gives the poorest result. Plot (5), i.e., the initially fertilized plot with a top-dressing of only NPK-fertilizer, gives dry weight results which are 8.1% better than the only initially fertilized plot (3).

Plot (4), i.e., the plot which was initially fertilized and provided with a top-dressing of NPK-fertilizer containing Berol VMA–09, gave the best result, or 18.5% better than plot (3).

*Example 3*

In the foregoing growth experiments, growth effects have been described on plants fertilized with NPK-fertilizer to which an addition of the wetting agent Berol VMA–09 has been made, the fertilizer being applied to the soil surface.

In the following experiments, which were carried out indoors, there was used as a fertilizer calcium cyanamide in grain form, with an addition of Berol VMA–09 in an amount of 3% of the dry weight of the fertilizer. The fertilizer was worked into the soil to a depth of 2 cms.

Since it was of interest to find out if better growth effects could be achieved also with plants having the same hereditary disposition and fertilized with an artificial fertilizer provided with an addition of wetting agent, the experiment was carried out with shoots taken from the same plant.

The begonia was chosen as a suitable experimental object because of the readiness with which it forms a great number of shoots from the stem. The shoots also form roots very easily after immersion in water.

From 14 shoots taken from the same mother plant, 4 shoots of the same weight, with the same number (5) of developed leaves and with a total leaf area for each shoot within the limits 54.0 to 56.5 cm.$^2$ were selected. The weight of each shoot was 4.7 g., which was obtained by cutting off the stem so that each of the four individual shoots had the same weight. The leaf areas were determined by copying the leaves onto a piece of paper and measuring the area of the pictures. After weight and area determination the shoots were put in the same beaker with water where they remained in ordinary tap water for 22 days to allow root formation.

On planting, each shoot was put in a separate plastic pot containing 742 g. earth, called "Garantijord Normal" having a pH value of 6.5. This earth is a commercially available type which is suitable for growing pot plants of various kinds, for example, begonias. Earth from the same package was used for planting all the four plants. Before the earth was added to the pots it was mixed in a fast soil mixer for 15 minutes so that moisture conditions, earth structure and amount of nutrients were the same for the whole amount of earth.

Before planting, the pot into which each plant was to be planted was decided by lot. Two of the pots (1) and (2) were each supplied with 0.7 g. calcium cyanamide in grain form with an addition of Berol VMA–09 to an amount of 3% of its dry weight. The other two pots (3) and (4) which were control pots were each supplied with only 0.7 g. calcium cyanamide in grain form. The calcium cyanamide in the test pots was of the same sort as in the control pots. The only difference was that the control pots had received calcium cyanamide with an addition of the wetting agent Berol VMA–09. The fertilizers which were equally distributed in all the pots were, before planting, worked down into the same amount of earth so that the fertilizer lay 2 cms. under the soil surface in all the pots.

At the time of planting there was no visible difference between the four shoots as far as stem or root were concerned.

During the whole test period all the four plants had the same light, heat and humidity conditions and watering was carried out at the same time with the same sort and quantity of water at the same temperature. No fertilizer, wetting agent or other substance apart from the water was added.

After 10 days in the pots the plants in the test pots (1) and (2) showed a tendency to be superior to the plants in the control pots (3) and (4). This tendency became more and more obvious as time passed.

After 50 days in the pots the test was interrupted in order to determine the weights. The plants were then cut off at the surface. The weight determination was carried out on the part above ground and the results are shown in the following Table VI:

TABLE VI.—WEIGHT DETERMINATION OF THE PART ABOVE GROUND OF BEGONIAS FERTILIZED WITH CALCIUM CYANAMIDE WITH AN ADDITION OF BEROL VMA-09 OR WITH THE SAME AMOUNT OF ONLY CALCIUM CYANAMIDE

| Pot No. | Weight before drying | | Weight after drying | | Moisture content, percent | |
|---|---|---|---|---|---|---|
| | Raw weight, grams | Relation number | Dry weight, grams | Relation number | | |
| Test pot (1) | 30.5504 | | 1.1388 | | 96.27 | With an addition of Berol VMA-09. |
| Test pot (2) | 29.1467 | | 1.0639 | | 96.35 | |
| Total | 59.6971 | 136.6 | 2.2027 | 132.8 | 96.31 | |
| Control pot (3) | 18.6388 | | 0.7600 | | 95.92 | No addition of wetting agent. |
| Control pot (4) | 25.0535 | | 0.8985 | | 96.41 | |
| Total | 43.6923 | 100.0 | 1.6585 | 100.0 | 96.20 | |

The dry weights were obtained after drying at a temperature of +100° to +105° centigrade for 18 hours.

The test shows that the plants which were fertilized with calcium cyanamide to which Berol VMA–09 had been added and which had been worked into the earth so that it lay under the surface of the soil achieved a considerably faster speed of growth than plants fertilized under identical conditions with the same amount of calcium cyanamide but without an addition of the wetting agent Berol VMA–09.

The weight increase for the test plants (1) and (2) was a 36.6% higher raw and a 32.8% higher dry weight as compared with the control plants (3) and (4).

The NPK-fertilizer used in the foregoing experiments contains 6.5% N as nitrate, 3.5% $NH_3$, 4.4% P, 10.0% $P_2O_5$, 12.5% K, 15% $K_2O$, 11.3% Ca, 0.4% Mg, 0.5% Na, 6.0% S, 0.9% Cl, 0.2% Fe, and 0.03% B.

What is claimed is:

1. A process for improving the growth of plants which comprises applying to the soil in which the plants grow a fertilizer composition consisting essentially of from about 25% to about 99.5% by weight of a fertilizer comprising sources of nitrogen, phosphorus, sulfur and nutrient metals formulated to a nutrient balance, and a relatively minor amount of at least 0.5% to about 10% by weight, sufficient to enhance the fertilizing action of the fertilizer, of an organic nonionic wetting agent having the formula:

$$R-A-(CH_2CH_2O)_x-CH_2CH_2OH$$

where R is selected from the group consisting of aliphatic hydrocarbon groups having from eight to eighteen carbon atoms and aralkyl groups having a hydrocarbon group of from eight to eighteen carbon atoms attached to the aryl nucleus, and attached to A through the aryl nucleus, A is selected from the group consisting of oxygen, sulfur, amino, amido, carboxylic ester and thiocarboxylic ester groups, and $x$ is a number from 8 to 20.

2. A process in accordance with claim 1, in which the composition also comprises peat.

3. A process in accordance with claim 1, in which the composition also comprises kieselguhr.

4. A process in accordance with claim 1, in which the composition is applied in aqueous solution.

5. A process in accordance with claim 1, in which the fertilizer composition is applied in powder form.

References Cited by the Examiner
UNITED STATES PATENTS

| | | | |
|---|---|---|---|
| 2,284,002 | 5/1942 | Lontz | 71—64 X |
| 2,314,091 | 3/1943 | Jones | 71—64 X |
| 2,614,917 | 10/1952 | Zuckel et al. | 71—64 |
| 2,867,944 | 1/1959 | Fletcher | 71—1 |
| 2,869,998 | 1/1959 | Vierling | 71—63 |

DONALL H. SYLVESTER, *Primary Examiner.*

ANTHONY SCIAMANNA, *Examiner.*